Aug. 11, 1942.   A. F. MOYER ET AL   2,292,580
POWER MOWER TRANSMISSION CONTROL
Filed Oct. 14, 1938   2 Sheets-Sheet 1

INVENTORS
AMOS F. MOYER
CARL H. BUCKENDORF
By Paul, Paul, Moore & Giese
ATTORNEYS Aug. 11, 1942.  A. F. MOYER ET AL  2,292,580
POWER MOWER TRANSMISSION CONTROL
Filed Oct. 14, 1938    2 Sheets-Sheet 2

INVENTORS
AMOS F. MOYER
CARL H. BUCKENDORF
By Paul, Paul, Moore & Giese
ATTORNEYS Patented Aug. 11, 1942

2,292,580

UNITED STATES PATENT OFFICE 2,292,580

POWER MOWER TRANSMISSION CONTROL

Amos F. Moyer and Carl H. Buckendorf, Minneapolis, Minn., assignors to Toro Manufacturing Corporation of Minnesota, Minneapolis, Minn., a corporation of Minnesota Application October 14, 1938, Serial No. 234,982

3 Claims. (Cl. 56—26)

The present invention relates to improved transmission mechanism for use in machines which are driven intermittently from a constantly rotating motor, such as in power lawn mowing machines, lawn rollers, household machines such as washers, driers, floor sanders and polishers, motor operated tools, and the like. The invention is applicable specifically to power-driven lawn mowers, and is hereinafter described with reference to such machines although the invention is obviously not limited to use in such a machine.

In lawn mowing machines of the type that are driven by a constantly rotating motor it is necessary to provide a power transmission between the motor and the mower which may be connected so as to drive the cutting reel and wheels of the mower and disconnected to permit the motor to idle without driving the mowing machine. This function, and the analogous function in the power transmissions of many other machines to which the invention is applicable, has heretofore been accomplished by providing a clutch at some point in the power transmission system, and while this mode of construction has been satisfactory the mechanism is somewhat expensive to build. Likewise, various power transmissions have been made in which a belt has been made slack in order to slip when power is to be disengaged and made tight when power is to be transmitted. These tight-loose belt drives operate best with flat belts, although they have been employed in some instances with V-belts. Tight-loose V-belt drives have been only partially successful due to the fact that as previously constructed, V-belt drives transmitted a small amount of power when in the loose condition. As a result the tight-loose belt principle has not been applicable where a complete absence of power transmission is desired when the belt is in the loose condition.

An object of this invention is to provide a simplified and stationary means to control a V-belt so that it will be substantially concentric with the drive pulley and free therefrom when made slack, so as to permit free slippage without any appreciable tendency to drive while slipping.

A further object of the invention is to provide a tightening and loosening device for a belt combined with a two-step change of speed ratio as speed reduction, whereby the driven shaft and the motor are both located on fixed centers, but the intermediate shaft is on a movable center that is operated for tightening and loosening the belt that extends thereto from the drive pulley.

We have found it desirable that the three shaft centers of this two-step drive shall be arranged in triangular relation, and that the path of motion for the intermediate center shall be substantially at right angles to a line from that center to the center of the driven shaft. By this arrangement the movable shaft center remains substantially at a fixed radius from the driven shaft and may be connected therewith by such means as a permanently tightened belt or by chain and sprockets, or by gears. By virtue of the triangular arrangement of centers (which may approximate a right triangle) operation of the intermediate shaft along its path of motion will directly tighten or loosen the belt that drives it from the motor.

It is accordingly an object of the invention to provide a power transmission in which the tendency toward power transmission is reduced to an unobjectionable minimum when the belt is in the loose condition.

It is a further object to provide a power transmission mechanism, including a member for positioning the belt substantially concentrically and substantially out of contact with the rotating drive pulley when in a position in which power is not transmitted.

It is a further object of the invention to provide a power transmission arrangement, including a drive shaft, a driven shaft and an idler shaft which is transversely movable, by which movement a belt may be slackened or tightened to vary the power transmitted, and in which mechanism, such movement of the idler shaft does not appreciably vary the distance between the idler shaft and the driven shaft.

When the power transmitting mechanism of the present invention is used on lawn mowing machines and the like devices which are guided by a handle or handles, it is desirable to provide a control member upon a handle of the machine within easy reach of the operator. The handles of such machines are pivoted on the machine for free movement within a definite range and the power transmission control must accommodate this freedom of movement, while at the same time maintaining a requisite precision of movement in the control. It is, therefore, an object of the invention to provide an operator control device as a part of the power transmission mechanism which is mounted upon a machine guide handle and freely movable therewith and at the same time capable of precise control of the power transmitting mechanism.

It is a further object of the invention to provide a control device including crank members which are movable to positions substantially at dead center when in an operated condition.

Other and further objects are those inherent in the mechanisms hereinafter specified, claimed and illustrated, and those suggested by such mechanism.

The invention is described with reference to the drawings in which

Figure 1:
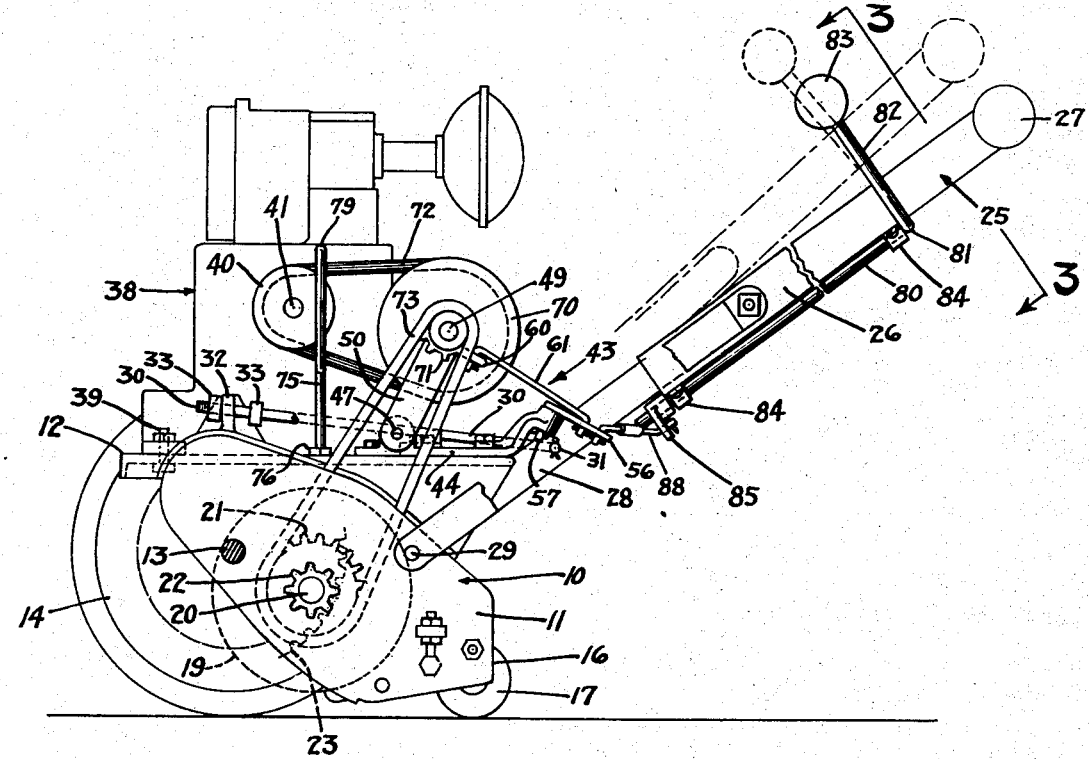
Figure 1 is an elevational view partly broken away showing the transmission mechanism applied to a lawn mowing machine.

The lawn mowing machine shown in Figure 1 comprises a mowing unit generally designated 10, having a frame consisting of side plates 11 and a motor bed plate 12 which may serve to position the side plates in definite spaced relation with respect to each other. Each of the side plates carries a stub axle 13 upon which the wheel 14 of the mower is journaled. In Figure 1 the wheel 14 which is nearest the observer, has been shown as removed from stub axle 13 so as to reveal the mechanism behind the wheel.

At the trailing edge 16 of the side plate there is revolvably mounted a ground roller 17 which serves to support the back end of the mower and which has the usual adjustment. The cutting reel of the mowing machine has not been illustrated but the outside path of movement of the blades is shown by dotted circle 19. The reel is carried upon through shaft 20 and is driven by a sprocket wheel 21. The outer end of shaft 20 carries a pinion gear 22 which meshes with an internal gear which is formed in the wheel 14. The path of the internal wheel gear is illustrated in the drawing at 23.

In the usual lawn mower constructions the reel shaft pinion is driven from the wheel gears through a rachet mechanism which according to usual practice is formed within the pinion gear. In the present invention the rachet mechanism (not shown) is reversed so that the pinion 22 drives the wheel gear 23, thus to propel the machine.

A guiding handle generally designated 25 is provided for the mowing machine and consists of a shank 26 preferably of rectangular cross-section which at its upper end carries a cross bar 27. The lower end of shank 26 carries a bifurcated fork 28 which has a spread sufficiently wide so that each prong of the fork overlies one of the side plates 11, the two prongs being pivoted to the side plates 11 at 29. Although pivoted at 29 the guide handle 25 is permitted only a limited movement with reference to the mowing machine frame. This is accomplished by means of a pair of supporting rods 30—30 which are connected to the fork at points 31 and disposed at an elevation above pivots 29. In Figure 1 the rod 30 which is nearest the observer, and the near portion of fork 28 are shown broken away, so as to reveal other parts behind the rod and fork. The rod 30 is connected to the frame of the mower by means of an angular plate 32 through which the rod slides, the limit of movement being determined by spaced adjustment collars or nuts 33. The mowing machine shown in Figure 1 is illustrated as being propelled by a gasoline engine generally designated 38 which is bolted to the motor bed plate 12 by means of bolts 39. Bed plate 12 is preferably slotted at 39a so as to permit a forward and backward movement of the motor to allow belt adjustment when necessary, as hereinafter explained. The motor is provided with a V-type driving pulley 40 which is mounted upon the motor drive shaft 41.

To the rear of the engine there is provided power transmission control mechanism generally designated 43 which comprises a control base 44 which is fastened to the motor bed plate 12 by means of studs 45, and a rocking counter-shaft assembly 48. The forward part of control base 44 is provided with a pair of upstanding ears 46 which carry a pivot shaft 47, upon which the counter-shaft assembly 48 is mounted. The rocking countershaft assembly comprises a pair of spaced legs 50 which are connected together at their upper ends by a tubular section 51. The lower ends of the legs 51 are pivoted upon shaft 47 and the tubular section carries counter-shaft 49 in bearings 52 that may be effectively lubricated from the chamber of tubular section 51.

The rear portion of control base 44 is provided with an inclined journal seat 55 which carries a triangularly shaped crank sector 56. The sector 56 has a pivot shaft 57 integrally formed upon it, which fits into the journal of seat 55 and is retained by cotter pin 58. The tubular portion 51 of the transmission rocking frame assembly 48 is provided with a rearwardly extending ear 60 which is pierced to receive one end of a coupling bar 61, the other end of which is connected to a hole in the sector 56. Coupling bar 61 is held in assembled relation by cotter pins 62—62.

The rocking frame 48 may be biased to the forward position by means of a spring 65 which is looped around the pivot shaft 47 and has one end in contact with the surface of control base 44 and the other end hooked around one leg 50 of the frame 48. The spring is tensioned so as to tend to move the frame 48 counterclockwise around shaft 47 as a pivot.

The shaft 49 is provided at one end with a V-belt pulley 70 and at the other end with a chain sprocket 71. The V-belt pulley is of a diameter somewhat larger than the drive pulley 40 of the motor to which it is connected by means of a V-belt 72. The sprocket 71 is connected to the reel shaft sprocket 21 by means of a drive chain 73.

The motor bed plate is provided with a belt supporting member generally designated 75 which comprises a round rod of steel or other suitable material which is fastened to the motor bed plate 12 by means of nuts 76. The belt guide comprises a lower vertical portion 77 and two spaced horizontal portions 78 and 79. The horizontal portions are spaced apart by a distance just sufficient to clear the upper and lower portions of the belt 72, when the belt is in the tight, or power transmitting condition. The purpose of this arrangement will be hereinafter described with reference to the operation of the device.

Figure 3:
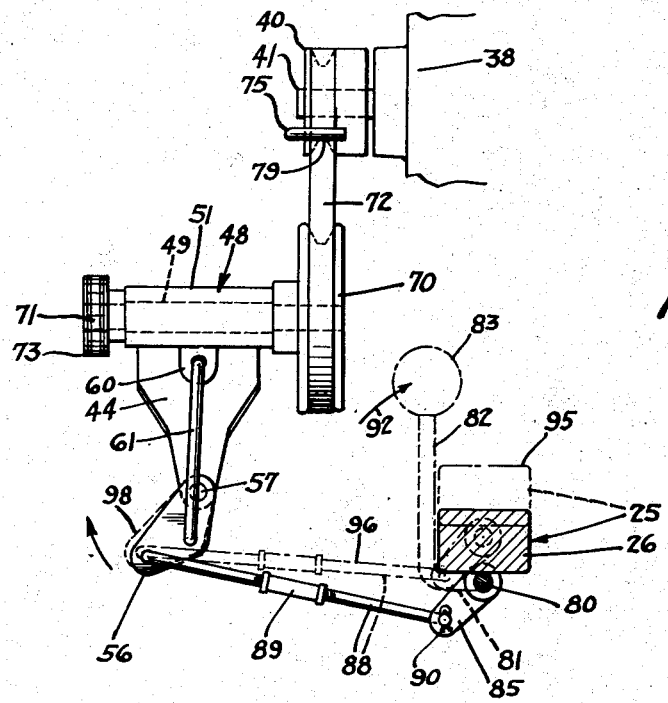
Figure 3 is a partial sectional view of the transmission mechanism and the mechanism control linkages taken on line 3—3 and showing the mechanism adjusted to the power transmitting position.

The guiding handle of the mowing machine is provided with a control actuating shaft 80 which is mounted beneath and longitudinally of the guide handle 25. The upper portion of the shaft 80 is bent outwardly for a short distance as at 81 in Figure 3, and then again at right angles upwardly as at 82. The outer end of portion 82 of the shaft is provided with a knob 83. The shaft 80 is connected to the handle by means of straps 84—84 and at its lower end is provided with a crank arm 85. The crank arm 85 is connected to the shaft so that it will extend downwardly to the left when the portion 82 of the control shaft is in a vertical plane, all as shown in Figure 3. When the shaft 80 is rotated counterclockwise by moving the knob 83 and portion 82 downwardly, the crank arm 85 assumes the position shown in Figure 4. The crank arm 85 is connected to sector 56 by means of a rod 88 which is preferably provided with a turnbuckle adjustment member 89. The rod 88 is held in assembled position on crank arm 85 by means of cotter pin 90 and is held to sector 56 by means of cotter pin 91.

Figure 2:
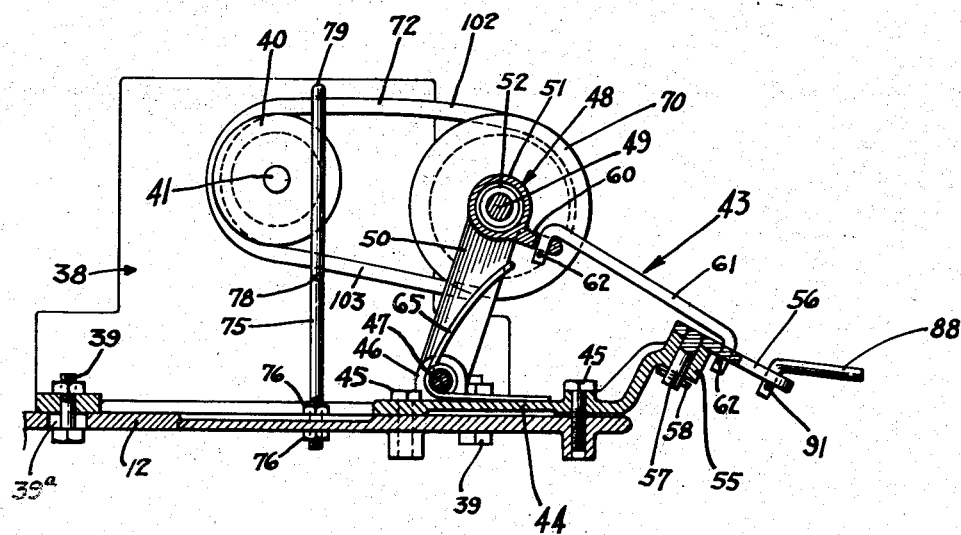
Figure 2 is an enlarged elevational view partly in section of the transmission mechanism.
Figure 4:
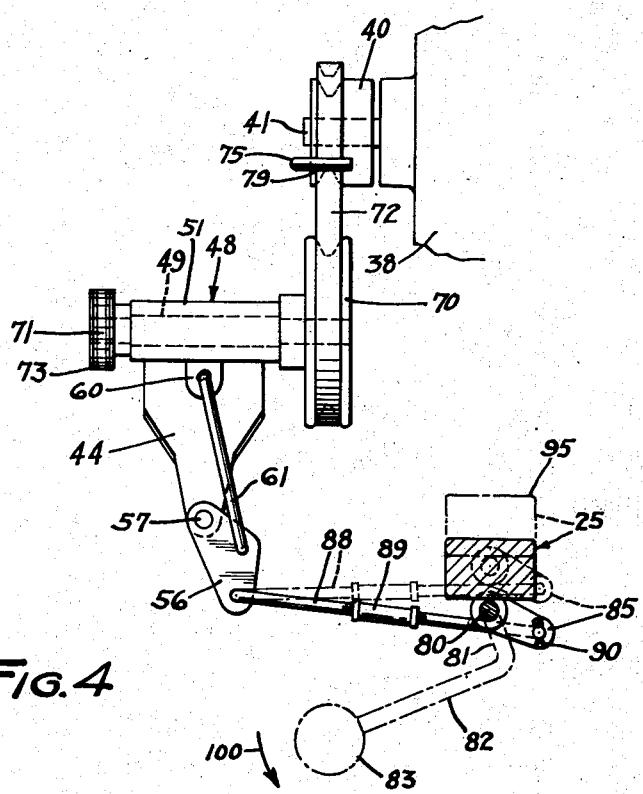
Figure 4 is a similar sectional view of the transmission mechanism and the mechanism control linkages showing the transmission mechanism adjusted to the position in which power is not transmitted.
Figure 5:
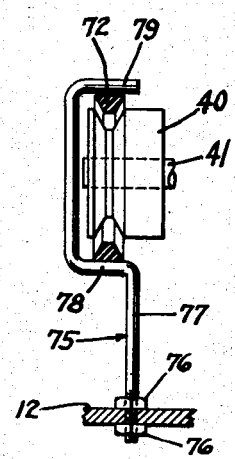
Figure 5 is a fragmentary elevational view of the belt guide bracket of the transmission mechanism.

Figure 3 and Figure 1 of the drawings illustrate the transmission mechanism in the power transmitting condition, whereas Figures 2 and 4 show the arrangement in the position in which no power is transmitted. It will be noted that when the transmission and controls are in the power transmitting position that knob 83 and portion 82 of the control mechanism have been moved upwardly in the direction of arrow 92 of Figure 3 until the portion 82 of the control rod abuts against the left side of guide handle shaft 25. In this condition crank arm 85 is downwardly to the left and sector 56 is in position such that coupling bar 61 will have moved slightly beyond the dead center position represented by the center of pivot shaft 57. The tension upon the belt 72 tends to pull the shaft 49 and the rocking assembly 48 in a forward direction, but since coupling bar 61 is slightly to the left of dead center, as explained above, the tension will be resisted and a slight torque produced in a clockwise direction upon sector 56, thus producing a tension upon rod 88 which holds the control mechanism in the operated direction represented by arrow 92.

It will be noted that as the operating handle 25 is raised to the dotted line position represented by the rectangle 95 and the dotted line position 96 of rod 88, that this will produce a very slight corresponding displacement of section 56 to the dotted line position 98. On account of the proximity of sector 56 and rod 61 to the dead center relation, this slight displacement is accompanied by substantially no movement of rocking frame 48, and the belt 72, and accordingly does not change its power transmitting characteristics. Hence the raising or lowering of the guide handle 25 throughout the range defined by nuts 33 on rod 30, has no noticeable effect upon the transmission when it is in the power transmitting position.

In a slightly modified form, this control mechanism may include a stop for sector 56 so that it will not attain position 98 upon vertical movement of handle 25. In this form of mechanism, the knob 83 is preferably so located with respect to the bearing center of shaft 80 and the angular position of arm 85 that it will be retained by gravity in position for transmission of power, for example by bending portion 82 toward the right from the position shown in Figure 3.

When the operating knob 83 is rotated downwardly in the direction of arrow 100 to the position shown in Figure 4 crank arm 85 draws rod 88 to the right and accordingly moves sector 56 to the position shown. The rod 61 is likewise moved to its new position and shaft 49 and rocking frame assembly 48 are moved forward in an amount to produce a substantial slackening of the belt 72. It will be noted that in this position also that raising the operating handle from the full line position to the dotted line position, represented by the rectangle 95 pivots the rod 88 about its connection to the bell crank plate 56 and moves the bell crank plate an amount so small as not to be capable of representation in the drawings. Hence, the movement up and down of guide handle 25 produces no change in the existing slack condition of the power transmitting belt 72.

The belt 72 is of endless variety V-belt of molded rubber and cord construction and in its slack condition tends to assume a nearly circular configuration. Hence, as the rocking frame 45 and pulley 70 are moved to the belt slackening position shown in Figures 2 and 4 the upper portion 102 of the belt 72 tends to arch slightly and the mower portion 103 tends to curve downwardly. This tendency is resisted by the portions 78 and 79 of the belt guide 75 since 78 contacts with the lower portion 103 of the belt and 79 contacts with the upper portion 102. The belt is accordingly forced to maintain its elongated condition even the slackened, and as a result is held away from substantially all portions of the belt-contacting surface of pulley 40. Should there occur only a slight contact between the belt and pulley 40, the only effect will be to draw the belt forwardly in its contact with portion 79 until contact with the pulley is eliminated. By the arrangement shown, the belt is held in a condition substantially out of contact with the V-pulley 40 so that there is no appreciable tendency to transmit power and pulley 70, shaft 49 and the interconnected reel shaft 20 are accordingly not revolved.

The position of the motor 38 is initially adjusted upon motor bed plate 12 by sliding it to an appropriate position in slots 39a, the bolts 39 then being drawn down tight. Adjustment is seldom needed except when the belt 72 is worn or elongated from prolonged use, or is to be replaced.

It will further be noted that countershaft 49 and rocking frame 48, when actuated from power transmitting position to the disengaged position, or vice versa, swing about the center of pin 47, which is located in accordance with the principles involved in this invention. By locating pin 47 on the line between the respective centers of shafts 49 and 20, the slight necessary movement of shaft 49 may take place without effecting the engagement of chain 73 on sprockets 71 and 21. Preferably, exact alignment of pin 47 should occur when belt 72 is tight, and the respective parts are in power-transmitting position. Obviously, it would in many instances, when applying this invention, be feasible to extend the arms of rocking frame 48 so as to eliminate a separate pin such as 47, and cause frame 48 to pivot about the center of driven shaft 20.

When the power transmission control is in the power-transmitting position the belt 72 is drawn into contact with pulley 40 and shaft 49 and interconnected reel shaft 20 of the mower are revolved, since the ratchet (not shown) between pinion 22 of the reel shaft and internal gear 23 of the wheels is arranged so that power will be transmitted from the pinion 22 to the reel shaft 23. Wheels 14 are likewise driven as the cutting reel revolves about the path 19. When it is desired to cut in close quarters the operator lifts the wheels 14 out of contact with the turf by bearing down on handle cross-bar 27. The wheels 14 hence run idle without drawing the mower forward and the mower may be wheeled backward and forward while the cutting reel is revolving.

It is obvious that various modifications may be made in the apparatus shown without departing from the spirit of the invention shown and herein claimed as follows.

We claim:

1. A power transmission control mechanism for a power transmission having a drive pulley, means mounting said pulley for rotation about an established axis, a driven pulley, a belt mounted on said pulleys, means for mounting said driven pulley, for shiftable movement away from the drive pulley to tighten said belt and toward said pulley to loosen said belt, stationary means adjacent said drive pulley to support the belt substantially out of contact with the drive pulley when the shiftable means is moved toward said drive pulley to loosen the belt, comprising means for moving said shiftable means including a crank plate, a mounting pivot for said crank plate, a link connected to said crank plate and connected to said shiftable means, and means for rotating said crank plate to a position in which the crank plate pivot is between the point of connection of said link and plate and the shiftable means and the link is substantially in line with said pivot.

2. In a power driven operator controlled machine of the walking type, having a machine frame, a motor thereon with a belt-type power transmission, including a shiftable frame carrying a belt pulley, and an operator handle for controlling the machine; an improved power transmission control for accurately tightening and loosening the belt from the operator handle position comprising, a shaft longitudinally of the handle having an operator grip thereon for rotating the shaft, a first crank on the shaft adjacent the machine, a second crank pivotally mounted on the machine at a position alongside said handle, a first link connecting said cranks whereby rotation of shaft by the operator rocks the second crank, and a second link connected at one end to the second crank and at its other end to said shiftable frame whereby movement of the second crank moves said shiftable frame.

3. The combination set forth in claim 2 wherein the pivot of the second crank is at a position intermediate the ends of the second link.

AMOS F. MOYER.
CARL H. BUCKENDORF.